(12) United States Patent
Wigdor et al.

(10) Patent No.: US 8,487,888 B2
(45) Date of Patent: Jul. 16, 2013

(54) MULTI-MODAL INTERACTION ON MULTI-TOUCH DISPLAY

(75) Inventors: Daniel J. Wigdor, Seattle, WA (US); Paul Armistead Hoover, Bothell, WA (US); Kay Hofmeester, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 819 days.

(21) Appl. No.: 12/631,609

(22) Filed: Dec. 4, 2009

(65) Prior Publication Data

US 2011/0134047 A1 Jun. 9, 2011

(51) Int. Cl.
*G06F 3/041* (2006.01)
*G06F 3/048* (2006.01)

(52) U.S. Cl.
USPC .......................................... 345/173; 715/764

(58) Field of Classification Search
None
See application file for complete search history.

(56) References Cited

U.S. PATENT DOCUMENTS

| | | | |
|---|---|---|---|
| 7,365,736 B2 | 4/2008 | Marvit et al. | |
| 7,441,202 B2 | 10/2008 | Shen et al. | |
| 2002/0015064 A1 | 2/2002 | Robotham et al. | |
| 2006/0026535 A1* | 2/2006 | Hotelling et al. | 715/863 |
| 2007/0152984 A1 | 7/2007 | Ording et al. | |
| 2007/0220444 A1* | 9/2007 | Sunday et al. | 715/788 |
| 2007/0273660 A1 | 11/2007 | XiaoPing | |
| 2009/0128516 A1 | 5/2009 | Rimon et al. | |
| 2009/0225039 A1 | 9/2009 | Williamson et al. | |
| 2010/0201636 A1* | 8/2010 | Kikin-Gil | 345/173 |
| 2010/0229129 A1* | 9/2010 | Price et al. | 715/863 |
| 2010/0309140 A1* | 12/2010 | Widgor | 345/173 |
| 2011/0078624 A1* | 3/2011 | Missig et al. | 715/802 |

OTHER PUBLICATIONS

Everitt, et al. "Modal Spaces: Spatial Multiplexing to Mediate Direct-Touch Input on Large Displays", Retrieved at <<http://citeseerx.ist.psu.edu/viewdoc/download;jsessionid=3EA1A5B6AFAFF12760634386B45C6A73?doi=10.1.1.60.1799&rep=rep1&type=pdf>>, CHI 2005, Apr. 2-7, 2005, Portland, Oregon, USA, pp. 1359-1362.

* cited by examiner

*Primary Examiner* — Christopher R Lamb
(74) *Attorney, Agent, or Firm* — Alleman Hall McCoy Russell & Tuttle LLP (57) ABSTRACT

Embodiments are disclosed herein that relate to multi-modal interaction on a computing device comprising a multi-touch display. One disclosed embodiment comprises a method of multi-modal interaction including recognizing a hand posture of a user's first hand directed at the display and displaying a modal region based on the hand posture, wherein the modal region defines an area on the display. The method further includes receiving an input selecting a mode to be applied to the modal region, wherein the mode indicates functionalities to be associated with the modal region and defines a mapping of touch gestures to actions associated with the mode. The method further includes, while the modal region remains displayed, recognizing a touch gesture from a user's second hand directed at the display within the modal region and performing an action on the display based upon a mapping of the touch gesture.

18 Claims, 9 Drawing Sheets

MULTI-MODAL INTERACTION ON MULTI-TOUCH DISPLAY

BACKGROUND

Computing systems having touch-gesture recognition capabilities may be configured to detect input touches from a user, such as touch inputs on the display surface, near-touch gestures directed toward the surface, etc. For the case of computing systems having multi-touch displays, multi-touch gestures from a single user may be detected, as well as multiple touch inputs (including multiple multi-touch inputs) from various users, and touch gestures in which an input is made via movement of a touch on or over the display.

Different gestures made on a multi-touch display may be mapped to different user interface controls. If each control is mapped to a different gesture, then a large set of user interface functionalities may correspond to a large set of touch gestures. However, in practice, a set of physical gestures that a user may reasonably be able to perform consistently and reliably may be relatively small. To address this issue, a user interface may utilize dedicated on-screen areas, such as touch buttons, sliders, checkboxes, and the like, in place of some gestures so that a total set of gestures utilized by a user may be reduced. However, such elements may clutter the user interface and leave little display space dedicated to actual content.

SUMMARY

Various embodiments that relate to multi-modal interaction on a multi-touch display are disclosed herein. For example, one disclosed embodiment provides, on a computing system comprising a multi-touch display, a method of multi-modal interaction. The method includes recognizing a hand posture of a user's first hand directed at the display and displaying on the display a modal region based on the hand posture, wherein the modal region defines an area on the display. The method further includes receiving an input selecting a mode to be applied to the modal region, wherein the mode indicates a family of functionalities to be associated with the modal region and defines a mapping of one or more touch gestures to one or more corresponding actions associated with the mode. The method further includes, while the modal region remains displayed, recognizing a touch gesture from a user's second hand directed at the display within the modal region on the display, and performing an action on the display based upon a mapping of the touch gesture from the user's second hand to the action.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments are disclosed herein that relate to enabling one or more users to interact with a multi-touch display via touch gestures, hand postures, etc. in a multi-modal and/or multi-user environment. For example, in some disclosed embodiments, a user may perform a hand posture with one hand directed toward the display to bring up a modal region within which the user's other hand may perform touch gestures, select settings from a contextual menu, etc. The position of such a modal region on the display may not only track the position of the user's hand, but may be easily invoked, locked, or removed from the display to facilitate a favorable user experience. Furthermore, multiple users using a same display device, such as a tabletop surface computing system, may be able to each invoke their own modal region, and may each work in a different mode or in a same mode, facilitating a more efficient group workspace.

Figure 1:
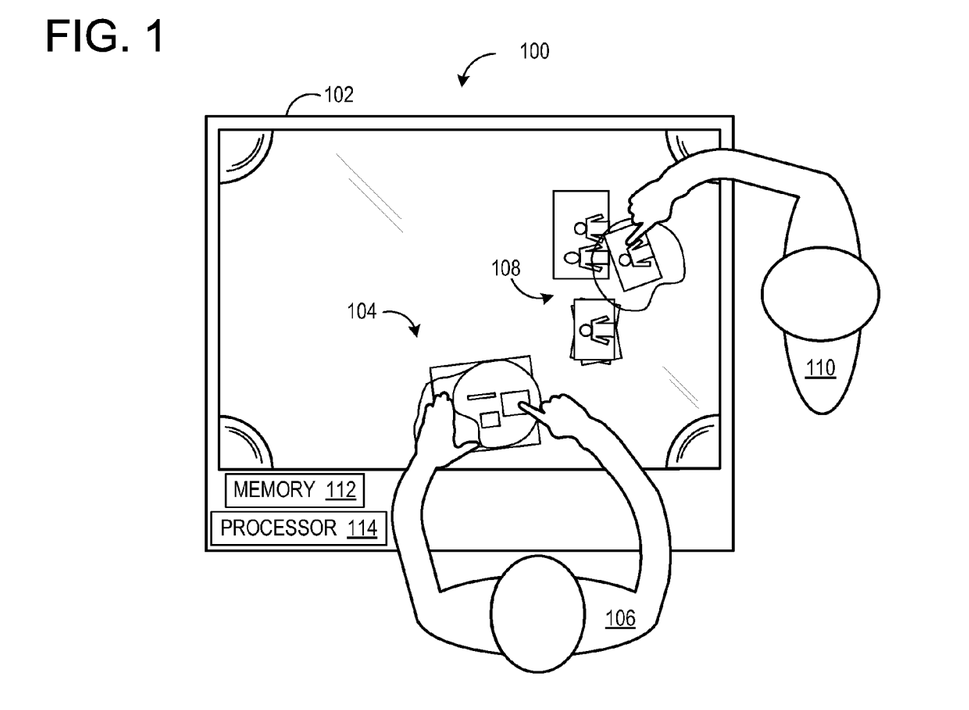
FIG. 1 schematically shows an example use scenario of multi-modal interaction on a multi-touch display in accordance with an embodiment of the present disclosure.

As an example FIG. 1 illustrates an example use scenario 100 of multi-modal interaction on a computing device 101 comprising a multi-touch display 102, as viewed from overhead. At 104, a first user 106 uses a modal region to manipulate content displayed on display 102. At 108, a second user 110 uses another modal region to manipulate content displayed on display 102. The computing device further comprises a processor 112, and memory 114 containing instructions executable by the processor to perform various functions, examples of which are described herein, related to enabling such users to interact with the computing device. It can be appreciated that the example shown in FIG. 1 is non-limiting. As described below in more detail below, a variety of different types of multi-modal interaction may be used without departing from the scope of this disclosure.

Figure 2:
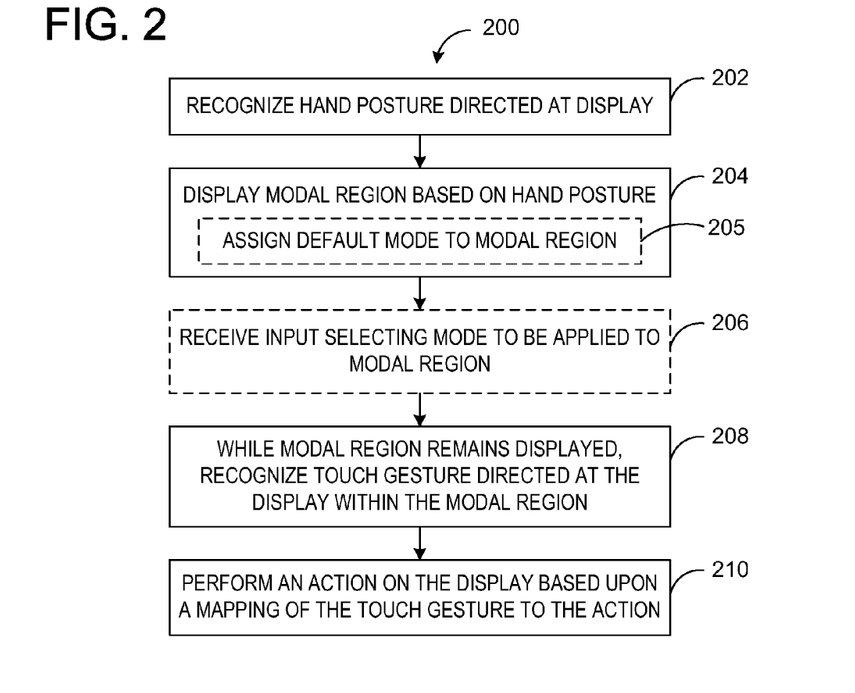
FIG. 2 shows a flow diagram of an embodiment of an example method of multi-modal interaction.

FIG. 2 illustrates a flow diagram of an embodiment of an example method 200 of multi-modal interaction, to be performed on a computing system comprising a multi-touch display. For example, the computing system may have a processor and memory comprising instructions stored thereon that are executable by the processor to perform such a method. At 202, method 200 includes recognizing a hand posture of a user's first hand directed at the display (e.g., touching the display). Such a hand posture may be any suitable hand posture of which the computing system is configured to recognize. Next, at 204, method 200 includes displaying on the display a modal region based on the hand posture.

As such, the modal region may be described as being "kinesthetically defined" since it is based on a hand posture, as opposed to being, for example, temporally defined. The modal region defines an area on the display. Additionally, the modal region may be displayed at a location on the display based on a location of the hand posture. For example, the modal region may be displayed in a close proximity to the hand posture.

It can be appreciated that recognizing a hand posture is just one suitable way of invoking a modal region. As another example, a user may use tools instead of their hands to either invoke the modal region or perform actions. For example, in some embodiments, a tagged object recognizable by the computing system or other suitable object may be used to invoke the modal region.

Figure 3:
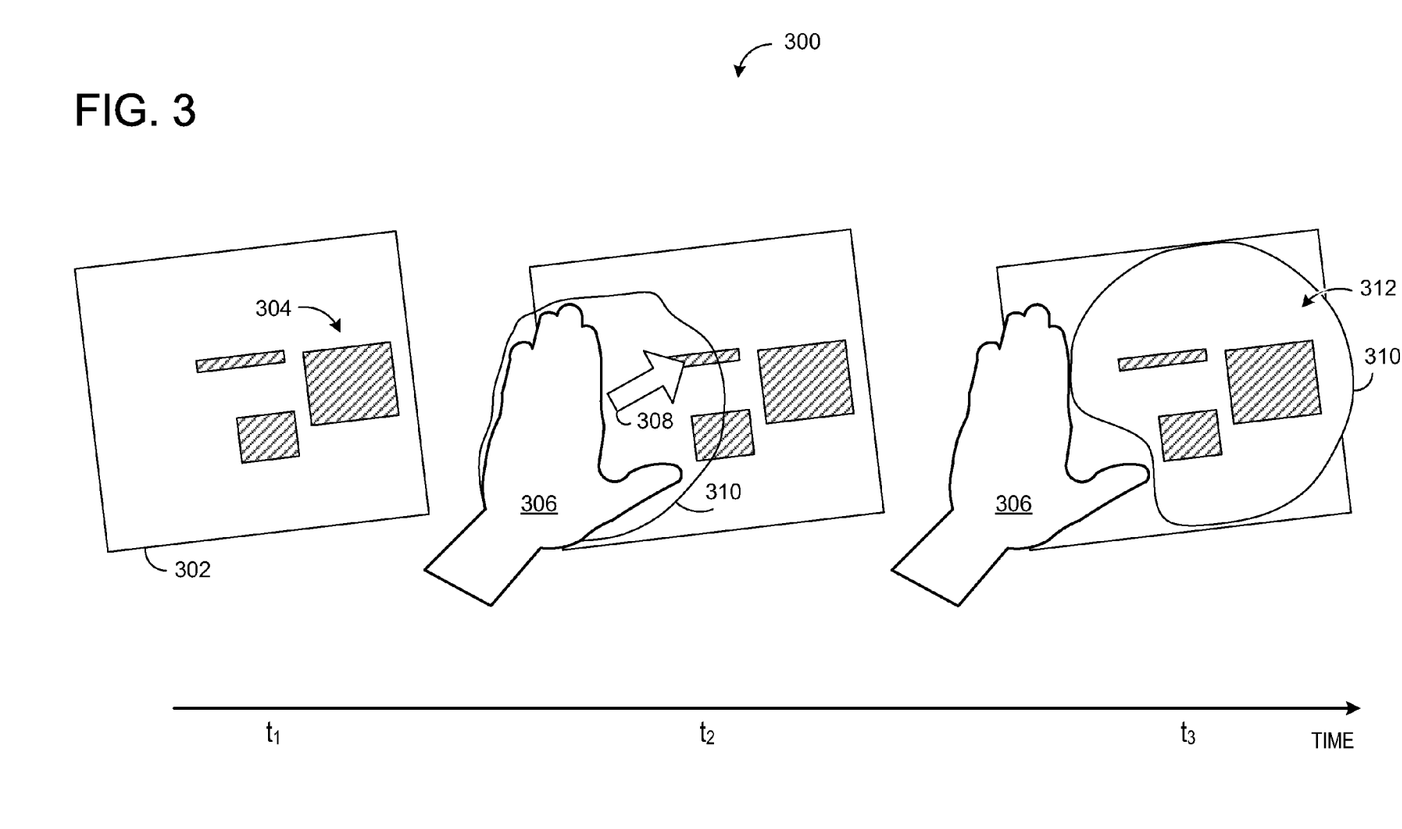
FIG. 3 schematically shows an example time sequence of invoking an example embodiment of a modal region displayed on a multi-touch display.
Figure 4:
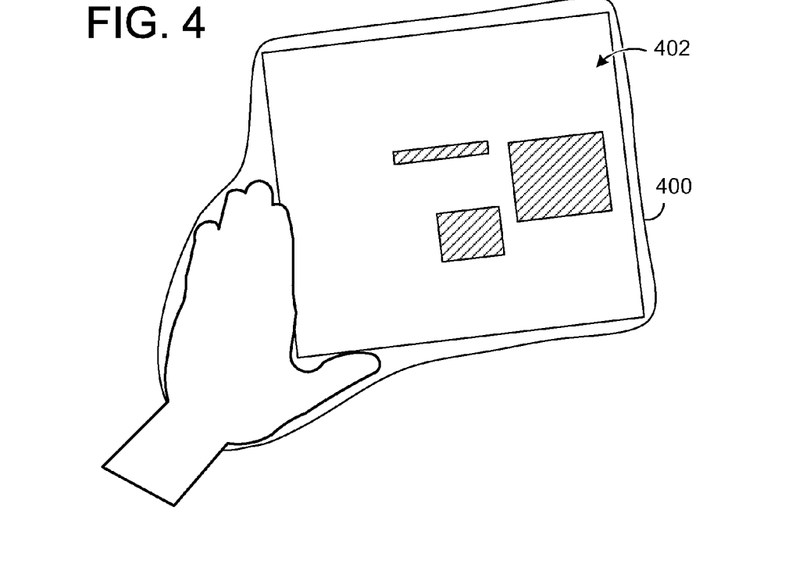
FIG. 4 schematically shows an example embodiment of a modal region displayed on a multi-touch display.

As an example, FIG. 3 illustrates a time sequence 300 that illustrates an invoking of an embodiment of a modal region on a multi-touch display. At a first time $t_1$, a document 302 having content 304 is displayed on a multi-touch display. At subsequent time $t_2$, a user's hand 306 is directed toward the multi-touch display, as indicated by arrow 308. As shown, the user's hand 306 is in a hand posture that is substantially L-shaped, wherein the user's thumb is extended outward from the hand. It will be appreciated that such a hand posture is nonlimiting, and is one example of a variety of possible hand gestures that may be used to invoke a modal region. In response to recognizing the hand gesture, at subsequent time $t_3$, a modal region 310 is displayed on the display. In this example, modal region 310 defines an area 312 on the display. It will be appreciated that a shape of area 312 is nonlimiting, and is one example shape of a variety of possible shapes a portion of the display area enclosed by a modal region may have. As another example, FIG. 4 schematically shows an example of another embodiment of a modal region 400 displayed on a multi-touch display, defining an area 402 of the display.

Figure 5:
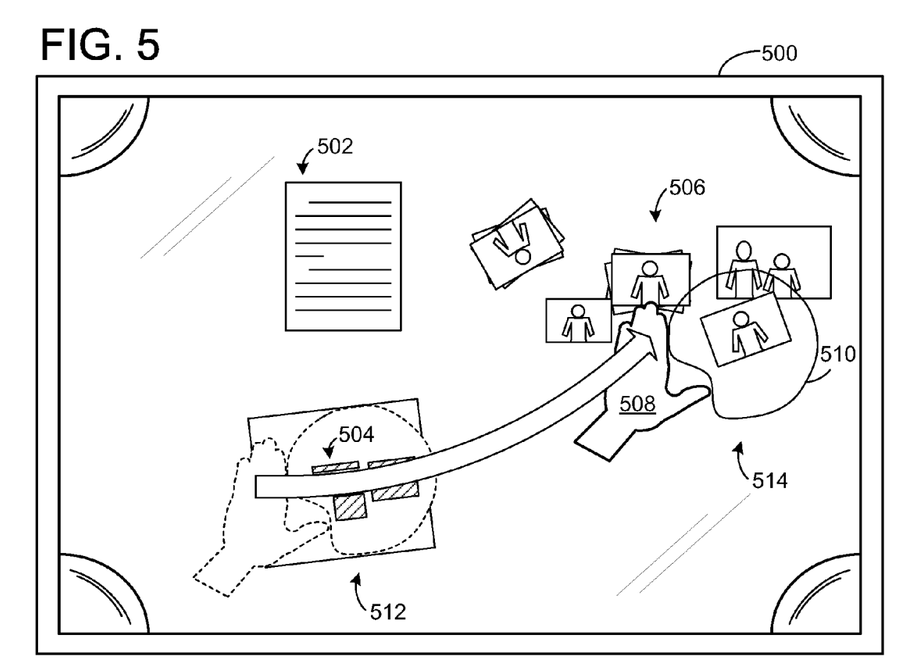
FIG. 5 schematically shows an example of adjusting a location of a modal region displayed on a multi-touch display.

The computing system may be further configured to display on the multi-touch display the modal region as tracking the hand posture when the hand posture changes its location on the display. In other words, the computing system may be configured to detect a change in the location of the hand posture and in response, adjust the location of the modal region. Accordingly, continuing with FIG. 2, method 200 may further include detecting a change in the location of the hand posture, and in response, adjusting the location of the modal region. As an example, FIG. 5 shows an example multi-touch display 500 displaying a document 502, content 504 and photos 506. A user 508 may originally invoke a modal region 510 to modify content 504, as indicated in dashed line at 512. At a later time, the user may decide to work with photos 506, and may adjust the location of modal region 510 simply by dragging a hand to a new location on display 500, as indicated in solid line at 514.

Continuing with FIG. 2, at 205, method 200 may include assigning a default mode to the modal region. The mode indicates a family of functionalities to be associated with the modal region, as explained in more detail below. Examples of possible modes include but are not limited to word-processing, graphics editing, photography editing, spreadsheet-processing, etc. In other words, a mode may be virtually any grouping of features a user may traditionally see on a traditional menu system, feature list, ribbon, etc. of traditional applications. It will be understood that, in other embodiments, no default mode may be assigned.

At 206, method 200 optionally includes receiving an input selecting a mode to be applied to the modal region. Such a mode may, for example, override any default mode assigned at 205. The mode may be selected in any suitable manner. In some embodiments, a user may select the mode from a list of modes displayed on the display via a touch gesture. As another example, a user may select the mode via a touch input directed at a virtual button displayed on the display. As yet another example, a list of available modes may be displayed on the display, and the user may select a mode from the list via a touch input from the user's second hand. In other embodiments, a user may select the mode from a virtual dial of modes displayed on the display, wherein a rotation gesture of the user's first hand virtually rotates the dial to select a mode. In yet other embodiments, the hand posture used to invoke the modal region may further select a mode. For example, one hand posture may invoke a paintbrush mode while another hand posture may invoke an image editing mode.

Such a mode defines a mapping of one or more touch gestures to one or more corresponding actions associated with the mode. For example, in a word-processing mode a pinch gesture may be mapped to an action that decreases font size, however in an image editing mode a pinch gesture may be mapped to adjusting a size of an image. As another example, in a spreadsheet mode a finger touch may be mapped to selecting a cell, however in a photography mode a finger touch may be mapped to selecting a photograph. By mapping touch gestures to actions associated with the mode, a user may utilize a smaller set of gestures since each gesture may be "reused" in a different context based on the mode.

At 208, method 200 includes, while the modal region remains displayed, recognizing a touch gesture from a user's second hand directed at the display within the modal region on the display. In some embodiments, the modal region remains displayed if the user's first hand is still performing the hand posture (e.g., still touching the display). However, in some embodiments, the modal region remains displayed if the user has "locked" the modal region in place, as will be discussed in more detail hereafter. With regard to the touch gesture, any suitable touch gesture that the computing system is configured to recognize may be used. Nonlimiting examples of such a touch gesture include a finger tap, a double tap, a finger drag, a holding gesture, a flicking gesture, a drag-and-drop gesture, etc. Such a touch gesture may also be a multi-touch gesture, wherein possible examples include but are not limited to a pinch gesture, a reverse-pinch gesture, a two-finger tap, a rotation gesture, etc.

In some embodiments of method 200, the user's first hand used to invoke the modal region may be a user's non-dominant hand, and the user's second hand performing the touch gesture may be the user's dominant hand. For example, a right-handed user may use her left hand to invoke the modal region, and may then use her right hand to direct touch gestures at the area of the display defined by the modal region. In other embodiments, a user may use a dominant hand to invoke a modal region. Further, as described above, it can be appreciated that a user may use tools instead of their hands when working with the modal region. For example, a pen or other suitable object may be used to perform a moded action in the modal region.

Next, at 210, method 200 includes performing an action on the display based upon a mapping of the touch gesture from the user's second hand to the action. For example, in some embodiments, performing the action may include changing a property of content displayed on the display. A small number of more specific examples of such an action include, but are not limited to, editing text, painting an image, adjusting photos in a layout, applying a sepia tone to a photo, opening an email application, or any other suitable action.

A modal region as described above may be described as operating in a layer "above" an application running on the computing system such that it is used to modify content displayed "underneath" the model region. Thus, whereas traditionally a user may have to open and switch between several applications to perform a variety of computing tasks, the modal region allows a user an easily-accessible multi-modal workspace in which to efficiently perform such tasks.

Figure 6:
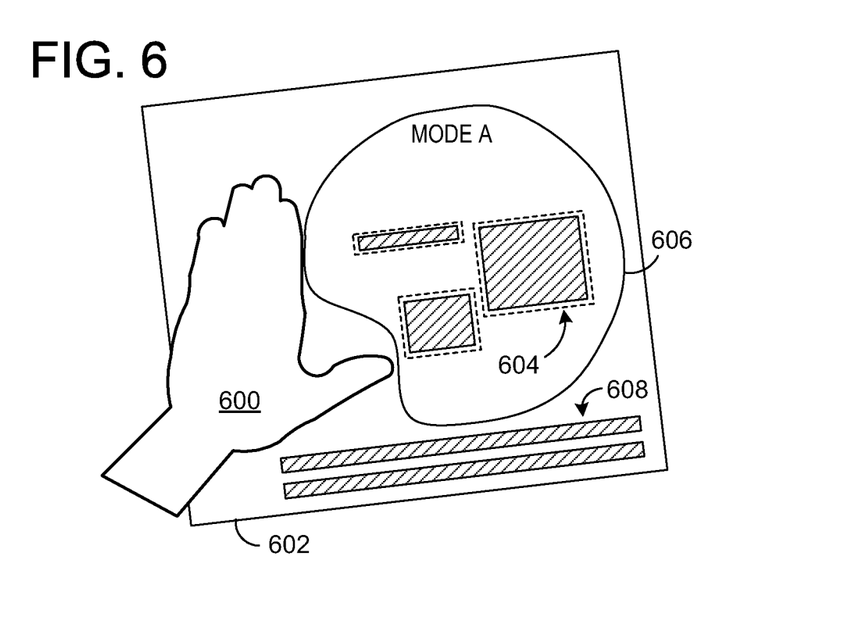
FIG. 6 schematically shows an example of using a modal region in accordance with an embodiment of the present disclosure.

The action performed on the display may be used to modify content inside and/or outside of the modal region. For example, in some embodiments, content inside a modal region may be modified. As an example, FIG. 6 shows a possible use scenario of a user 600 editing a document 602 in an example mode "Mode A." As shown, content 604 within the modal region 606 becomes activated and may be modified by actions based on touch gestures received within the modal region. Accordingly, content 608 outside of the modal region may not be modified by such touch gestures within modal region 606.

In other embodiments, the action performed on the display may modify content outside of the modal region. As an example, a gesture may be performed within the modal region that adjusts a size of all images displayed on the display regardless as to their location and/or proximity to the modal region. Further, in some embodiments, a user may start manipulating content inside the modal region, and during that same interaction (i.e., without lifting the touch gesture from the second hand) end the touch gesture outside of the modal region, while in the same mode. In such embodiments, a mode can then stay "persistent" outside of the modal region if the touch gesture was initiated inside of the modal region. It will be understood that whether a gesture modifies content inside or outside of the modal region may depend upon the mode applied to the modal region.

In some embodiments, the computing system may be configured to recognize a plurality of hand postures of one or more other users, and display a modal region associated with each user's hand posture. As such, method 200 may further include recognizing one or more hand postures, and displaying on the display a modal region for each user based on the location of the recognized hand posture. Since each user may utilize their own modal region of the multi-touch display, several users may work on a single multi-touch display, thereby facilitating multi-user environments. Users may be working with the same content on the display, or different content. Thus, in some cases a user may select a same mode for their modal region as other users may be using. As an example, a team of users may each utilize their modal region in a photo-editing mode, and work together to edit a set of photos displayed on the multi-touch display. Alternatively, a user may select a different mode for their modal region. As an example, one user may utilize their modal region in a word-processing mode to add text to a document, while another user utilizes their modal region in an image editing mode to format graphics of the same document.

Modal regions may be temporally overlapping, in that more than one modal region may be utilized on the multi-touch display at one time. Further, in some embodiments, at some times, two or modal regions may be located in positions that may cause the modal regions to be spatially overlapping. As such, the computing device may be further configured to detect "collisions" of modal regions, and deny or allow overlapping of modal regions based on the modes of the modal regions. For example, the computing system may, upon detecting a potential overlap of two modal regions displayed on the display, determine whether displaying the two modal regions as overlapping is allowed or unallowed. Such a comparison may be based upon each mode active in each of the two regions. For example, the computing system may have a predetermined set of rules allowing overlap for certain pairings of compatible modes, while not allowing overlap for other pairings. Upon making such a determination, the computing system may then display the two modal regions as overlapping or not overlapping depending upon the determination.

Method 200 may further include detecting a lifting of the user's first hand, and in response, ceasing display of the modal region. In other words, the modal region may be removed from the display by a user simply lifting their first hand from the display, thus removing the hand posture from the display. As such, the user may then subsequently invoke a modal region by performing a subsequent hand posture on the display. Thus, the modal region may be easily invoked and removed from the display. In other embodiments, the modal region may persist for some predetermined period of time after lifting of the first hand is detected.

In some embodiments, a user may have the ability to lock their modal region at a particular location on the multi-touch display, such that the user may then lift the first hand (i.e. the hand that invoked the modal region) from the display. In other words, in response to receiving a locking input, method 200 may include continuing to display the modal region after the user's first hand is lifted. The modal region may be locked in any suitable manner. As an example, a user may select to lock the modal region by a touch input directed at a virtual button displayed on the display. As another example, a user may perform a gesture or modify their hand posture to lock the modal region.

Figure 7:
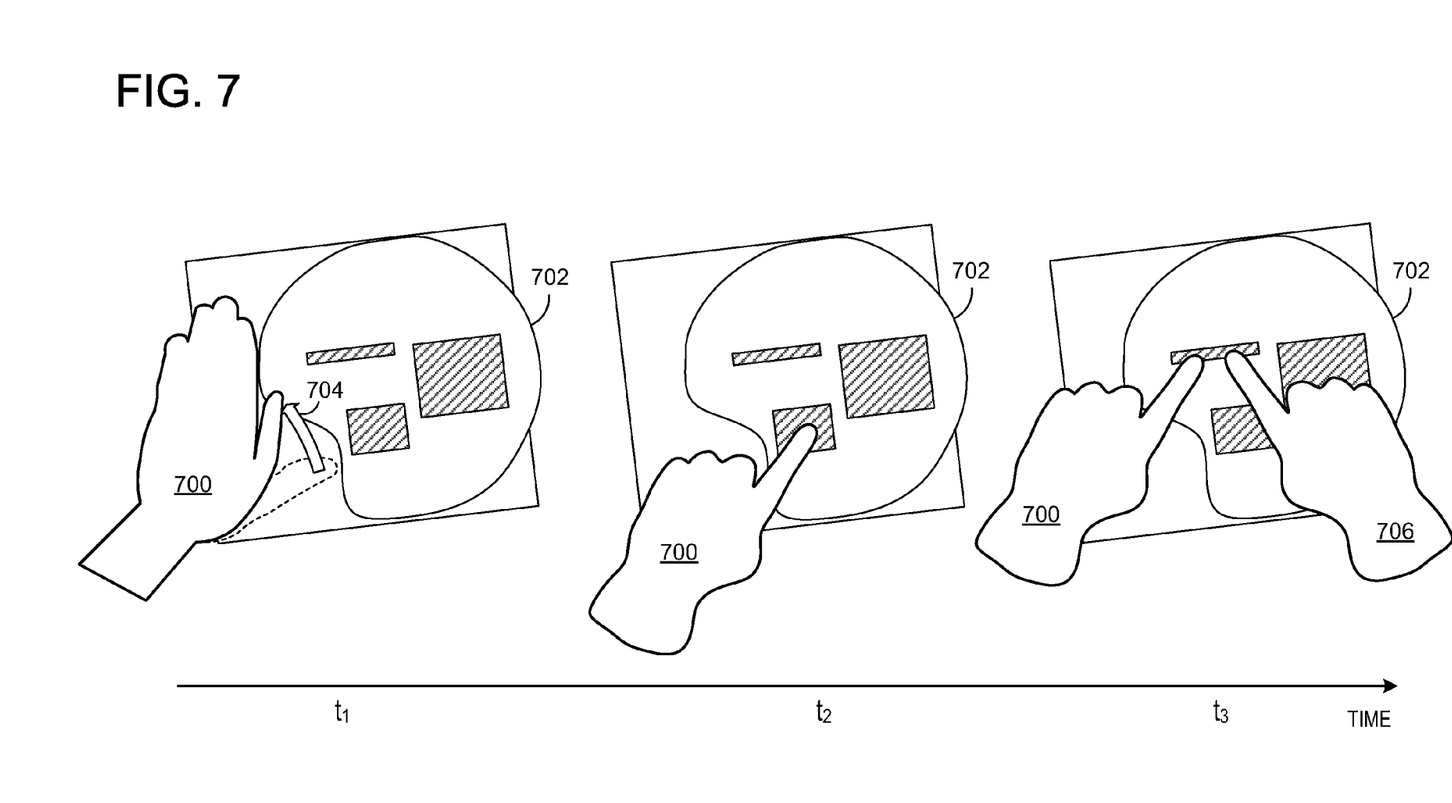
FIG. 7 schematically shows an example time sequence of an embodiment of a method of locking an embodiment of a modal region displayed on a multi-touch display.

FIG. 7 shows a time sequence illustrating an embodiment of locking a modal region. At an earlier time, a user's first hand 700 has invoked a modal region 702 displayed on the display. At a subsequent time $t_1$, the user modifies his hand gesture by bringing his extended thumb toward his palm as indicated at arrow 704. The computing system recognizes this gesture as locking the modal region, allowing the user to lift his hands from the display and the computing system will continue to display the modal region. Accordingly, at subsequent times $t_2$ and/or $t_3$, the user may utilize the locked modal region 702 with his first hand 700 and/or second hand 706 without having to maintain the hand posture on the display.

It will be appreciated that a modal region may be configured to facilitate user input in any suitable manner, various non-limiting examples of which are described in more detail below.

Figure 8:
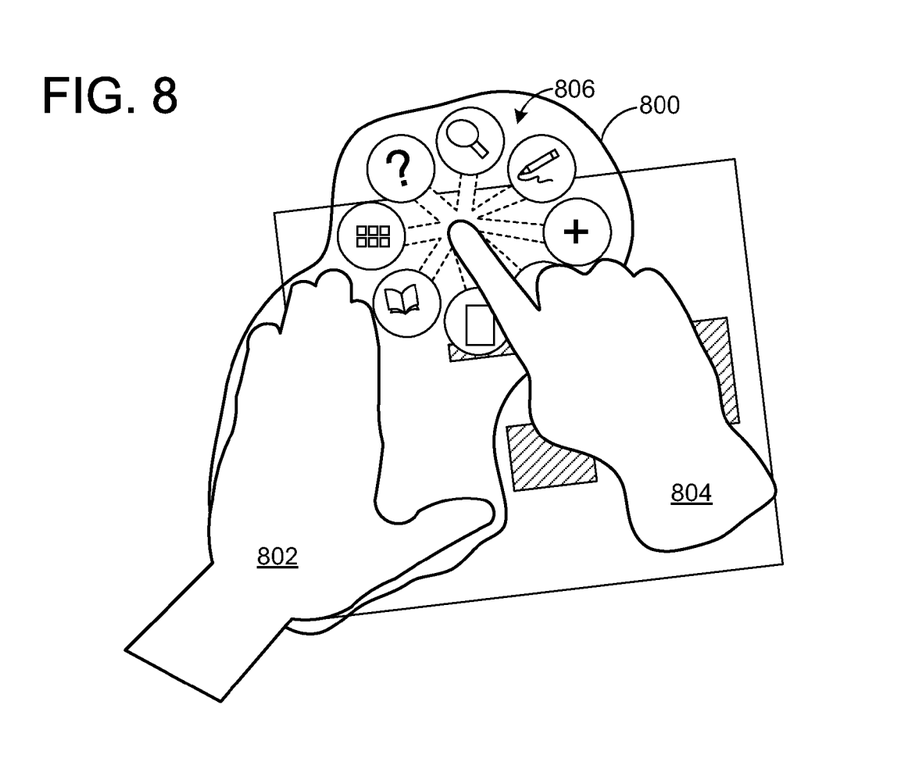
FIG. 8 schematically shows an embodiment of a mode selection for a modal region.

FIG. 8 illustrates an example of mode selection for an embodiment of a modal region. The depicted example shows a modal region 800 invoked by a hand posture of the user's first hand 802. Upon invoking the modal region, a user's second hand 804 may direct a touch input toward the display within the modal region, upon which a menu 806 of possible modes may be displayed. For the case of the nonlimiting example illustrated in FIG. 8, such a menu may include a photo layout mode, a help mode, a search mode, a drawing mode, etc.

Figure 9:
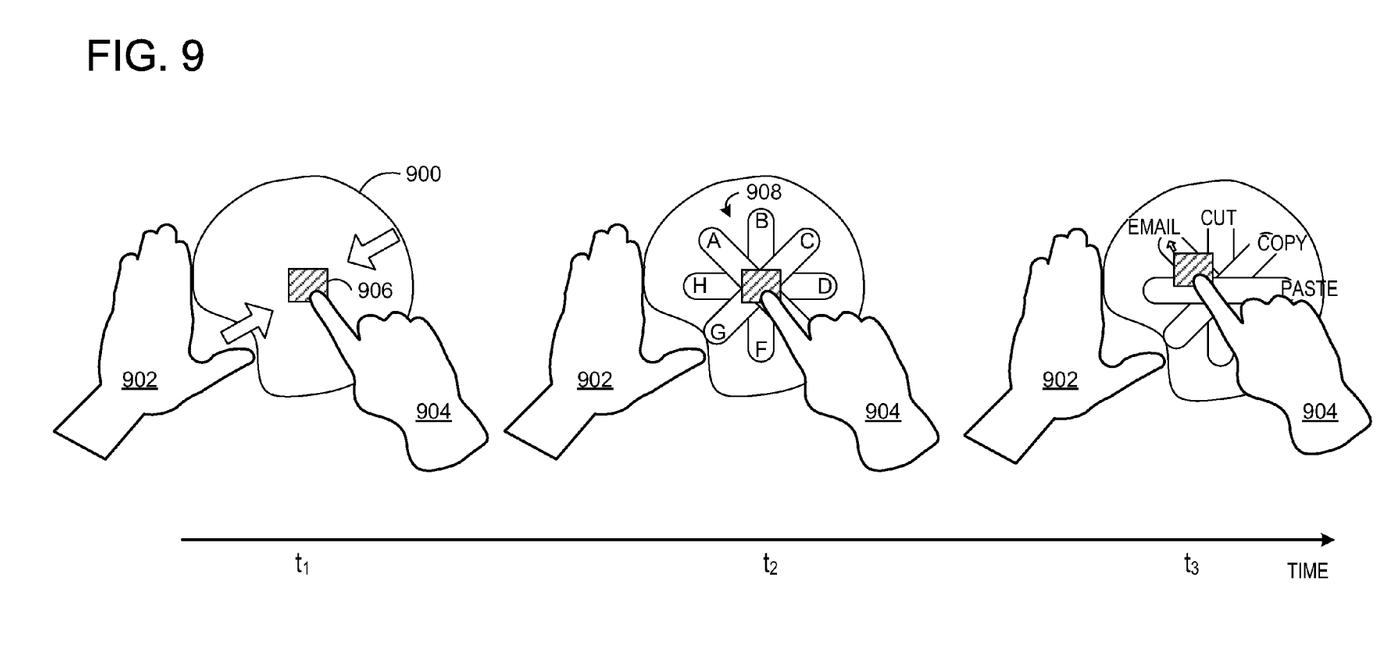
FIG. 9 schematically shows an example time sequence depicting an embodiment of a method of using a modal region.

FIG. 9 illustrates an example time sequence of using an embodiment of a modal region to perform an action on an object displayed in the modal region. The depicted example shows a time sequence, wherein a modal region 900 has been invoked by a hand posture of the user's first hand 902. Upon invoking the modal region, a user's second hand 904 may direct a touch input toward an object 906 displayed on the display within the modal region 900, such as shown at time $t_1$. Upon recognizing the touch input, at subsequent time $t_2$, a menu 908 is displayed which has selectable options A, B, C, etc. For example, object 906 may be an image, and the menu options may include emailing the image, cutting the image, copying the image, etc. At subsequent time $t_3$, the user may choose to, for example, email object 906 by dragging object 906 to the corresponding heading. In response to recognizing the dragging touch gesture of the user's second hand 904, the computing system may display an action of displaying the user's email client. As such, the user may easily switch from manipulating the object in, for example, an image editor to emailing the image to a friend.

Figure 10:
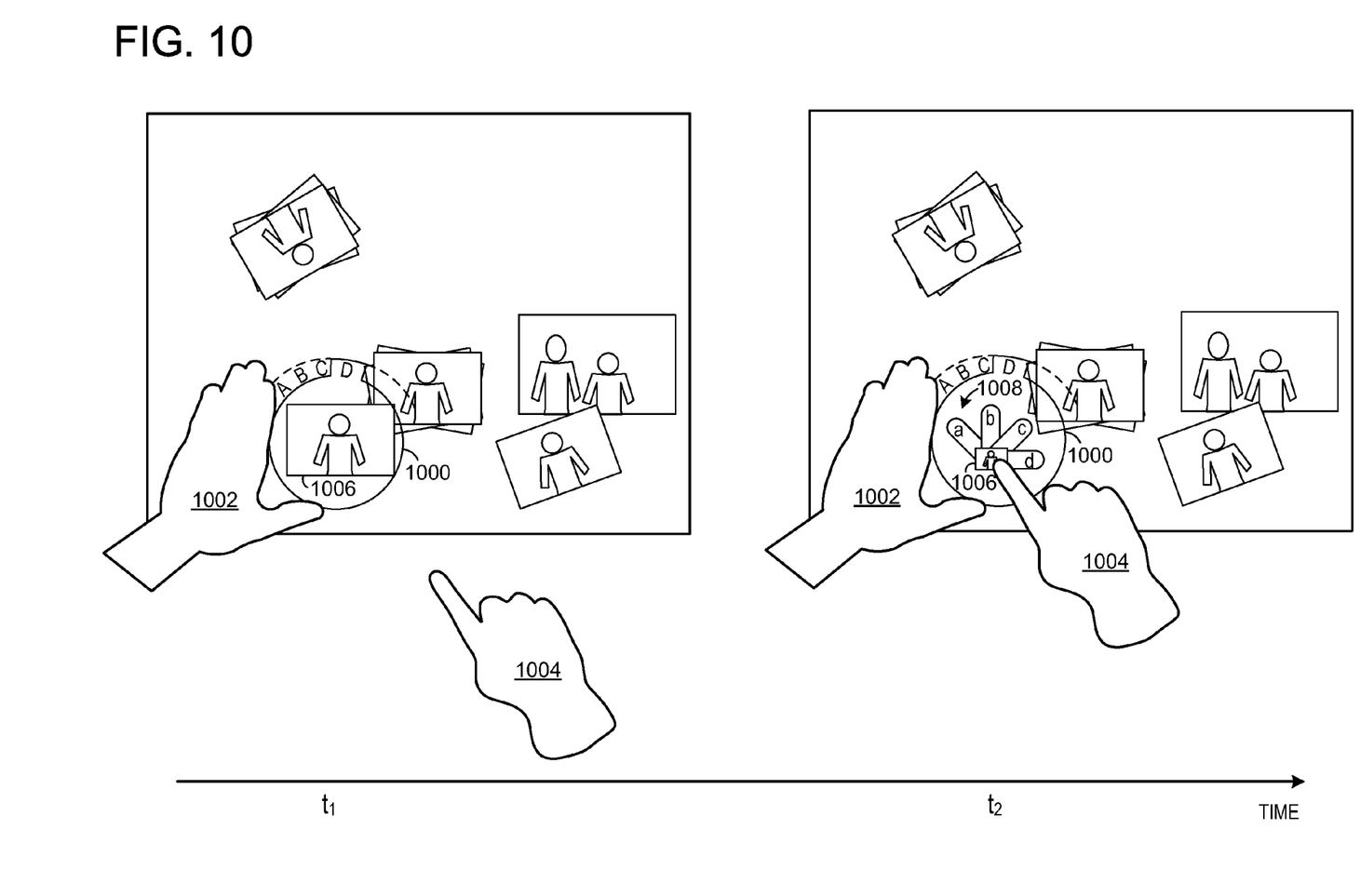
FIG. 10 schematically shows another example time sequence depicting an embodiment of a method of using a modal region.

FIG. 10 illustrates another example time sequence of using an embodiment of a modal region to perform an action on an object displayed in the modal region, in the context of a photo editing mode. The depicted example shows a time sequence, wherein a modal region 1000 has been invoked by a hand posture of the user's first hand 1002. Upon invoking the modal region, a user's second hand 1004 may direct a touch input toward a photo 1006 displayed on the display within the modal region 1000, such as shown at time $t_1$. In such an example, the modal region is in an example mode D. Upon recognizing the touch input, the multi-touch display displays a menu 1008 of example options a, b, c and d corresponding to actions that may be performed on the object 906, as shown at subsequent time $t_2$. Such actions may be based on the particular type of photo editing mode selected for the modal region 1000, namely mode D. For example, mode D may be a filter mode of the photo editing application, and options a through d may represent various types of post-processing photographic digital filters, such as a sepia filter, a black-and-white filter, etc. Thus, a user may drag photo 1006 to option a corresponding to a sepia filter to apply a sepia tone to photo 1006.

Figure 11:
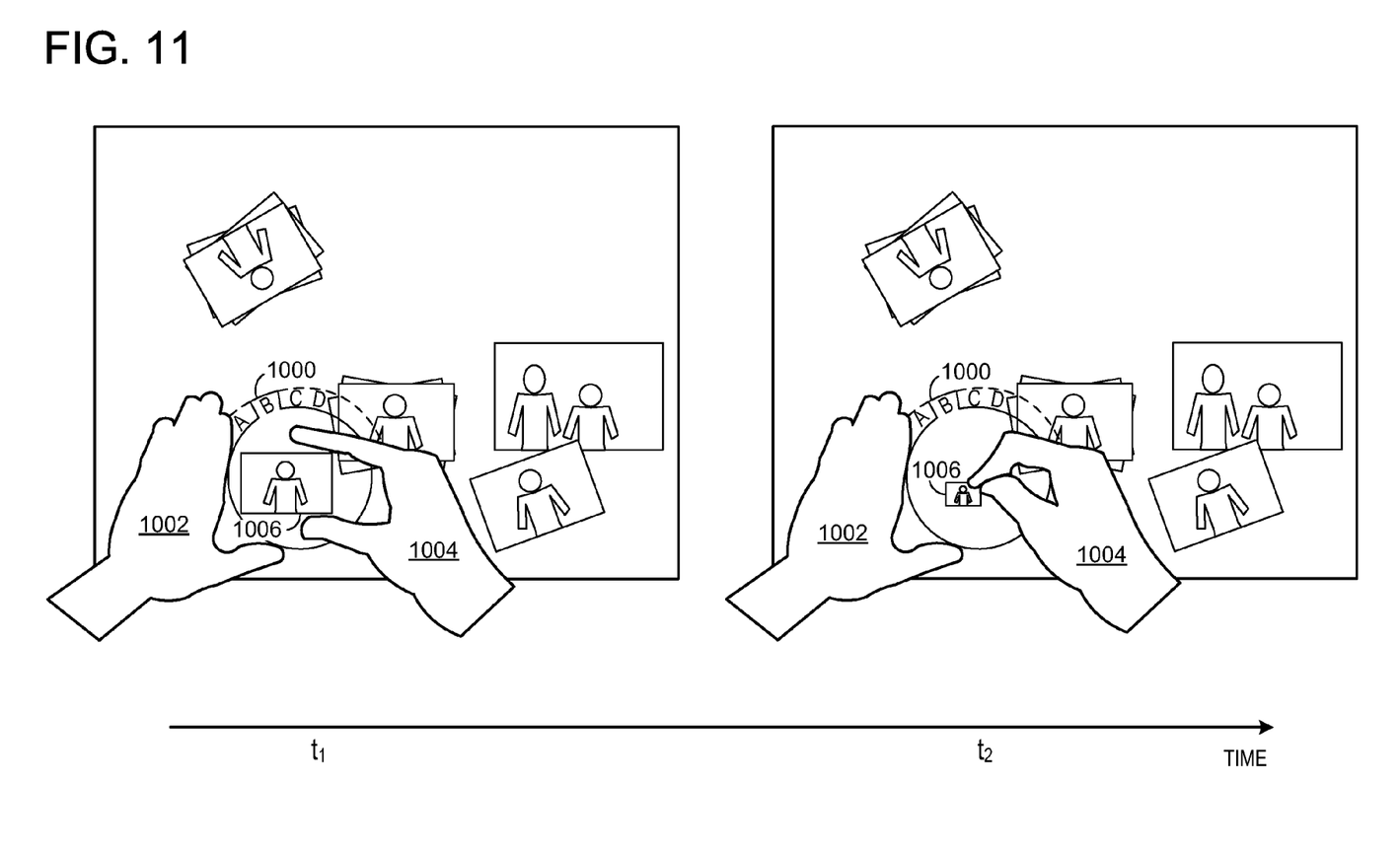
FIG. 11 schematically shows yet another example time sequence depicting an embodiment of a method of using a modal region.

FIG. 11 shows yet another example time sequence of using a modal region in the context of a photo editing application as illustrated in FIG. 10. In this example, the user has selected a different mode for modal region 1000, namely mode B. Upon invoking the modal region, a user's second hand 1004 may direct a pinching touch gesture toward photo 1006, such as shown at time $t_1$. In such an example, the computing system may determine that the pinching gesture made by the user corresponds to an action of decreasing the size of the photo 1006. Accordingly, at subsequent time $t_2$, the computing device performs the action of decreasing the size of photo 1006.

It will be appreciated that the computing devices described herein may be any suitable computing device configured to execute the programs described herein. For example, the computing devices may be a mainframe computer, personal computer, laptop computer, surface computer, portable data assistant (PDA), computer-enabled wireless telephone, networked computing device, or other suitable computing device or devices, and may be connected to each other via computer networks, such as the Internet. Such computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. On a computing system comprising a multi-touch display, a method of multi-modal interaction, the method comprising:
displaying on the display a first content item and a second content item;
recognizing a hand posture of a user's first hand directed at the display;
displaying on the display a modal region based on the hand posture, the modal region defining an area on the display at a first location on the display based upon a location of the hand posture;
applying a mode to the modal region, the mode indicating a family of functionalities to be associated with the modal region and defining a mapping of one or more touch gestures to one or more corresponding actions associated with the mode;
while the modal region remains displayed, recognizing a first touch gesture interacting with the first content item within the modal region at the first location on the display;
performing a first action on the display based upon a mapping of the first touch gesture to the first action:,
detecting a change in the location of the hand posture;
in response, displaying a movement of the modal region to a second location on the display such that the modal region moves over the second content item;
recognizing a second touch gesture interacting with the second content item within the modal region at the second location on the display; and
performing a second action on the display based upon a mapping of the second touch gesture to the second action.

2. The method of claim 1, further comprising detecting a hand posture of a second user's first hand directed at the display, and in response, displaying on the display a second modal region.

3. The method of claim 2, wherein the hand posture of the second user's first hand and the hand posture of the user's first hand are temporally overlapping.

4. The method of claim 1, further comprising detecting lifting of the user's first hand, and in response, continuing to display the modal region after lifting is detected.

5. The method of claim 1, further comprising detecting lifting of the user's first hand, and in response, ceasing display of the modal region.

6. The method of claim 1, further comprising receiving a locking input, detecting lifting of the user's first hand after receiving the locking input, and continuing display of the modal region after the user's first hand is lifted.

7. The method of claim 1, wherein applying the mode comprises applying a default mode to the modal region.

8. The method of claim 1, wherein applying the mode includes receiving an input selecting the mode via a touch input directed at a virtual control displayed on the display.

9. In a display device comprising a multi-touch display, a computing device comprising:
a processor; and
memory comprising instructions stored thereon that are executable by the processor to:

display on the display a first content item and a second content item;
recognize a hand posture of a hand touching the display;
display on the display a modal region based on the hand posture, the modal region defining an area on the display and being displayed at a first location on the display based on a location of the hand posture;
receive an input selecting a mode to be applied to the modal region, the mode indicating a family of functionalities to be associated with the modal region and defining a mapping of one or more touch gestures to one or more corresponding actions associated with the mode;
recognize a first touch gesture interacting with the first content item within the modal region at the first location on the display;
perform a first action on the display based upon a mapping of the first touch gesture to the first action;
detect a change in the location of the hand posture and in response, adjust the location of the modal region to a second location on the display such that the modal region moves over the second content item;
while the modal region remains displayed, recognize a second touch gesture from a second hand directed at the second content item within the modal region at the second location on the display;
perform a second action on the display based upon the mapping of the second touch gesture to the second action; and
recognize a removal of the hand posture from the display and in response, remove display of the modal region from the display.

10. The computing device of claim 9, wherein the instructions are further executable to determine that the modal region is to remain displayed if the hand posture of the hand is still touching the display device.

11. The computing device of claim 9, wherein the instructions are further executable to recognize a plurality of hand postures, and to display on the display a second modal region associated with each hand posture recognized.

12. The computing device of claim 11, wherein the modal region is a first modal region, and wherein the instructions are further executable to detect a potential overlap of the first modal region and the second modal region displayed on the display, to determine whether displaying the first modal region and the second modal region as overlapping is allowed or unallowed based upon a comparison of the mode applied to the first modal region and a mode applied to the second modal region, and to display the first modal region and the second modal region as overlapping or not overlapping depending upon the comparison.

13. The computing device of claim 9, wherein the instructions are executable to perform the first action on the display by changing a property of content displayed on the display within the modal region.

14. The computing device of claim 9, wherein the instructions are executable to perform the first action on the display by changing a property of content displayed on the display outside of the modal region.

15. In a computing system comprising a multi-touch display, a method of interacting with a plurality of users, the method comprising:
displaying a first content item and a second content item on the display;
recognizing a hand posture of a first hand of a first user directed at the display;
in response to recognizing the hand posture of the first hand of the first user, displaying on the display a first modal region based on the hand posture of the first hand of the first user, the first modal region defining an area on the display and being displayed at a first location on the display based upon a location of the hand posture;
receiving an input selecting a mode to be applied to the first modal region, the mode indicating a family of functionalities to be associated with the first modal region and defining a mapping of one or more touch gestures to one or more corresponding actions associated with the mode;
while the first modal region remains displayed, recognizing a touch gesture from a second hand of the first user directed at the first content item within the first modal region, and in response, performing a first action on the display based upon a mapping of the touch gesture from the second hand of the first user to the first action;
detecting a change in the location of the hand posture, and in response adjusting the location of the first modal region to a second location on the display such that the first modal region moves over the second content item;
while the first modal region remains displayed, recognizing a second touch gesture from a second hand directed at the second content item within the first modal region at the second location on the display;
perform a second action on the display based upon the mapping of the second touch gesture to the second action;
while the first modal region remains displayed, recognizing a hand posture of a first hand of a second user directed at the display;
in response to recognizing the hand posture of the first hand of the second user, displaying on the display a second modal region;
receiving an input selecting a mode to be applied to the second modal region; and
while the second modal region remains displayed, recognizing a third touch gesture directed at the display within the second modal region, and in response, performing a third action on the display based upon a mapping of the third touch gesture to the third action.

16. The method of claim 15, wherein the mode applied to the first modal region and the mode applied to the third modal region are a same mode.

17. The method of claim 15, wherein the mode applied to the first modal region and the mode applied to the third modal region are different modes.

18. The method of claim 15, further comprising displaying the second modal region at a location on the display based on a location of the hand posture of the first hand of the second user.

* * * * *